United States Patent
Hue et al.

(10) Patent No.: US 9,656,739 B2
(45) Date of Patent: May 23, 2017

(54) HIGH LIFT SYSTEM FOR AN AIRCRAFT AND METHOD FOR INFLUENCING THE HIGH LIFT CHARACTERISTICS OF AN AIRCRAFT

(71) Applicant: Airbus Operations GmbH, Hamburg (DE)

(72) Inventors: Xavier Hue, Bremen (DE); Bernhard Schlipf, Bremen (DE)

(73) Assignee: Airbus Operations GmbH (DE)

( * ) Notice: Subject to any disclaimer, the term of this patent is extended or adjusted under 35 U.S.C. 154(b) by 657 days.

(21) Appl. No.: 14/063,536

(22) Filed: Oct. 25, 2013

(65) Prior Publication Data

US 2014/0048655 A1    Feb. 20, 2014

Related U.S. Application Data

(63) Continuation of application No. PCT/EP2012/057758, filed on Apr. 27, 2012.
(Continued)

(30) Foreign Application Priority Data

Apr. 28, 2011 (DE) .......................... 10 2011 018 906

(51) Int. Cl.
*B64C 9/22* (2006.01)
*B64C 9/02* (2006.01)
*B64C 9/14* (2006.01)

(52) U.S. Cl.
CPC ................. *B64C 9/22* (2013.01); *B64C 9/02* (2013.01); *B64C 2009/143* (2013.01)

(58) Field of Classification Search
CPC .... B64C 9/02; B64C 9/22; B64C 9/24; B64C 9/16; B64C 9/18; B64C 2009/143
USPC ........................................................ 244/214
See application file for complete search history.

(56) References Cited

U.S. PATENT DOCUMENTS

| | | | |
|---|---|---|---|
| 2,172,370 A | 9/1939 | Fahrney | |
| 4,159,089 A * | 6/1979 | Cole | ......................... B64C 9/24 244/214 |

(Continued)

FOREIGN PATENT DOCUMENTS

| | | |
|---|---|---|
| EP | 0045987 A1 | 2/1982 |
| EP | 0230681 A2 | 8/1987 |
| GB | 2277305 A | 10/1994 |

OTHER PUBLICATIONS

NASA Contractor Report 4746 "High-Lift Systems on Commercial Subsonic Airliners" von Peter K. C. Rudolph.

*Primary Examiner* — Justin Rephann
(74) *Attorney, Agent, or Firm* — Lerner, David, Littenberg, Krumholz & Mentlik, LLP

(57) ABSTRACT

A high lift system for an aircraft includes a basic body, a flap which is movably mounted on the basic body and has a flap edge, and a retaining element. The high lift system is set up to form a gap between the flap edge and the basic body. The retaining element is mounted on a region of the flap close to the flap edge and extends towards the basic body to restrict the distance between the flap edge and the basic body. The retaining element is preferably configured as a linear attachment means. Consequently, a gap dimension between a flap and a basic body can be influenced to restrict flexing effects during loading of the flap and of the basic body.

10 Claims, 4 Drawing Sheets

Related U.S. Application Data

(60) Provisional application No. 61/479,925, filed on Apr. 28, 2011.

(56) References Cited

U.S. PATENT DOCUMENTS

| | | | | |
|---|---|---|---|---|
| 4,262,868 A * | 4/1981 | Dean | B64C 9/22 | 244/214 |
| 4,402,277 A * | 9/1983 | Wainwright | B63H 9/0607 | 114/102.22 |
| 4,585,192 A * | 4/1986 | Clifford-Jones | B64C 3/50 | 244/210 |
| 4,650,140 A * | 3/1987 | Cole | B64C 9/24 | 244/214 |
| 4,753,402 A * | 6/1988 | Cole | B64C 9/22 | 244/210 |
| 4,880,189 A * | 11/1989 | Day | B64C 9/22 | 244/130 |
| 5,158,252 A * | 10/1992 | Sakurai | B64C 9/22 | 244/213 |
| 5,474,265 A * | 12/1995 | Capbern | B64C 9/24 | 244/214 |
| 5,588,258 A * | 12/1996 | Wright | E05F 15/627 | 49/340 |
| 6,375,126 B1 * | 4/2002 | Sakurai | B64C 3/50 | 244/214 |
| 6,508,439 B1 * | 1/2003 | Fink | B64C 3/50 | 244/215 |
| 7,249,735 B2 * | 7/2007 | Amorosi | B64C 13/24 | 244/214 |
| 7,578,484 B2 * | 8/2009 | Fox | B64C 9/22 | 244/214 |
| 8,382,044 B2 * | 2/2013 | Holzhausen | B64C 9/22 | 244/213 |
| 8,444,094 B2 * | 5/2013 | Voss | B64C 9/24 | 244/214 |
| 2006/0102803 A1 * | 5/2006 | Wheaton | B64C 7/02 | 244/214 |
| 2009/0272843 A1 | 11/2009 | Schlipf | | |
| 2012/0012712 A1 * | 1/2012 | Eden | B64C 3/28 | 244/201 |
| 2012/0097791 A1 * | 4/2012 | Turner | B64C 3/48 | 244/1 N |
| 2012/0104180 A1 * | 5/2012 | Brown | B64C 9/24 | 244/214 |
| 2012/0292454 A1 * | 11/2012 | Schroeder | B64C 9/24 | 244/214 |
| 2013/0075536 A1 * | 3/2013 | Schroder | B64C 9/24 | 244/214 |
| 2013/0206917 A1 * | 8/2013 | Sakurai | B64C 9/24 | 244/214 |
| 2013/0233967 A1 * | 9/2013 | Salthouse | B64C 9/22 | 244/99.3 |
| 2014/0059826 A1 * | 3/2014 | Schlipf | B64C 1/14 | 29/426.1 |

* cited by examiner

HIGH LIFT SYSTEM FOR AN AIRCRAFT AND METHOD FOR INFLUENCING THE HIGH LIFT CHARACTERISTICS OF AN AIRCRAFT

CROSS-REFERENCE TO RELATED APPLICATIONS

The present application is a continuation of International Application No. PCT/EP2012/057758, filed Apr. 27, 2012, which claims priority from German Patent Application No. 10 2011 018 906.8, filed Apr. 28, 2011 and which claims the benefit of the filing date of U.S. Provisional Application No. 61/479,925, filed Apr. 28, 2011, the disclosures of which are incorporated herein by reference in their entirety.

TECHNICAL FIELD

The invention relates to a high lift system for an aircraft and to a method for influencing the high lift characteristics of an aircraft.

BACKGROUND OF THE INVENTION

To achieve predetermined aerodynamic characteristics, vehicles and in particular aircraft often have flap systems in which flaps are movably mounted on a basic body and can be brought by an actuator into a neutral position and into different working positions to influence an air flow surrounding the vehicle or to apply forces onto the vehicle. For example, commercial aircraft have quite a number of different flap systems which are set up for different purposes of use.

The purpose of a high lift system of an aircraft is, for example, to achieve a significantly increased coefficient of lift by enlarging the wing area and increasing the camber of the wing for take-off and landing phases. For this purpose, appropriate flaps are movably mounted on the leading and trailing edges of a wing. To achieve a separation of a flow where there are particularly high angles of attack and particularly low flight speeds, the flaps can often be moved such that gaps form between the flaps and the wing allowing a high-energy air flow to occur on the upper side of the wing.

To achieve optimum operation of a gap-forming flap system of this type, it is imperative that the gap dimensions achieved when the flaps are subjected to air loads are the same as the desired dimensions. Particularly when a flap is configured as a leading edge flap of a wing with a gap being produced between the rear edge of the leading edge flap and the leading edge of the wing, air loads deform the leading edge flap, consequently influencing the gap dimensions. Due to the mounting and guidance of the leading edge flap at individual so-called drive stations which are distributed over the leading edge of the wing, one or more areas of the leading edge flap are positioned almost fixed in space in front of the wing, while various flexing lines can be present in the adjacent regions of the leading edge flap. This deformation of the leading edge flap is independent of a deformation of the wing, so that in an extreme case, gap dimensions which are too small or too large are present between the leading edge flap and the leading edge of the wing in some areas of a conventional flap system.

An overview of the prior art in respect of the configuration of high lift components can be found, for example, in the NASA Contractor Report 4746 "High lift Systems on Commercial Subsonic Airliners" by Peter K. C. Rudolph.

SUMMARY OF THE INVENTION

Achieving predefined aerodynamic characteristics of a flap system for a vehicle is very important, particularly in the case of safety-critical applications of a flap system. Therefore, an aspect of the invention proposes a high lift system for an aircraft comprising a basic body and a flap which is mounted movably on the basic body and has a flap edge which can be moved such that a gap can be formed between the flap edge and the basic body, the expanse of said gap remaining as exact as possible and as constant as possible along the flap and being oriented locally by a predetermined tolerance.

A high lift system according to an embodiment of the invention for an aircraft comprises a basic body, a flap which is movably mounted on the basic body and has a flap edge, and a retaining element. The high lift system is set up to form a gap between the flap edge and the basic body. The retaining element is mounted on a region of the flap close to the flap edge and extends to a mounting point on the basic body such that the flap edge can be pulled and/or flexed in the direction of the basic body by the retaining element to restrict the distance between the flap edge and the basic body.

Accordingly, a high lift system is supplemented by a retaining element, the purpose of which is to restrict a gap dimension defined by the distance between the flap edge and the basic body. A gap dimension which varies due to air loads and vibration phenomena can be restricted by the retaining element to a predetermined length at least with regard to an inadmissible increase.

The retaining element can be realized in various ways. Since the flap is mounted movably with respect to the basic body and the movement of the flap edge can be restricted by a tensile force, it is appropriate for the retaining element to be configured in particular to receive a tensile force. In this manner, it would be possible to use a flexible retaining element which does not resist a backwards movement of the flap.

A retaining element can also be configured such that it is shortened during a movement of the flap or such that it moves either into the basic body or into the flap or into both bodies. For this purpose, the basic body and/or the flap must have an appropriate passage opening which allows relative movement of the retaining element. If the flap is configured as a Krüger flap, the opening can be located in the region of a flap edge.

In an advantageous embodiment, in an extended state, the flap is mounted or held at a point remote from the retaining element such that this point does not move in the direction of the basic body when the retaining element is pulled and/or flexed in the direction of the basic body. This means that the flap can be moved relative to a mounting point defined by kinematics and is also aligned or secured there by the retaining element.

In an advantageous embodiment of the invention, the retaining element is arranged on a displacement means, which is set up to secure the retaining element at a first end and to provide a free end which extends away from the displacement means, the distance of which end from the displacement device can be adjusted individually and variably by the displacement device itself. In this respect, the free end of the retaining element could be mounted on a region of the flap close to the edge, the displacement device being arranged on or preferably in the basic body itself, from which the retaining element extends with its free end towards the flap edge.

At the same time, in a preferred embodiment, the displacement device could also be arranged in a region close to the flap edge so that the free end of the retaining element extends out of the flap, through the passage opening and towards the basic body, where it is then mounted or secured.

Operating the displacement device can actively adjust the distance between the flap edge and the basic body or at least restrict it to a maximum dimension.

In a preferred embodiment of the invention, the retaining element is configured as linear attachment means which is dimensionally resilient and flexible and is set up in particular to absorb tensile forces. A retaining element of this type could be configured as a rope, a wire, a chord or the like, and the choice of material should be guided by several marginal conditions. These conditions lie especially in a particularly extensive temperature range which the retaining element experiences during installation. In particular when a high lift system of this type is used on a commercial aircraft, temperatures can arise on the wing structure which range between −50° C. and +60° C. Although the external temperatures are not at extreme values when a high lift system of this type is used on an aircraft, it should be noted that while the aircraft is waiting on the ground on hot days, the retaining element reaches a certain temperature which could result in a reduced initial tensile strength during activation of the high lift system. At the same time, during a cruising flight of an aircraft, a retaining element of this type could cool down to such a considerable extent that an initial resilience during activation of the high lift system could be too low after the cruising flight and the risk of tearing due to a brittle fracture tendency would be greater than, for example, at room temperature. Recommended as suitable materials for a retaining element are particularly metallic materials, for example braided steel cables, but also high-tensile plastics materials which can tolerate the previously mentioned temperature range, for example polyamide or glass fibre-reinforced polyamide.

In an advantageous embodiment of the invention, the displacement device comprises a winding body on which the retaining element is attached by a first end, the winding body being set up to exert a continuous tensile force on the retaining element, which tensile force does not prevent the retaining element from unwinding from the winding body, but at the same time allows an independent winding onto said winding body. By presetting a mechanically maximum possible rotation, the displacement device would in practical terms be a simultaneous storage means for the retaining element and a means for adjusting the gap dimension. The retaining element would then be realized as a linear attachment means which extends outwards from the winding body and through a passage opening. The winding body can also be configured as a drawing winch, into which are integrated a drive unit and optionally also a ratchet to prevent an undesired rotation.

In an advantageous embodiment of the invention, the displacement device comprises a rotary actuator which is coupled to the winding body in order to wind up the retaining element. Consequently, a force can be actively exerted on the retaining element so that, for example, when the flap is moved into a neutral position, the retaining element is simultaneously wound onto the winding body and consequently does not influence the movement of the flap.

In an advantageous embodiment of the invention, the rotary actuator is configured as a spring element which is set up to subject the winding body to a torque sufficient for winding up the retaining element. This has the advantageous effect that no active means is required for the retaining element to constantly track the moving flap. This means that when the flap is retracted, the retaining element is returned practically automatically into a neutral position or the like which is not disruptive from an aerodynamic perspective.

In an advantageous embodiment of the invention, the winding body can only be rotated as far as a specific point and it has a stop which prevents the retaining element from being drawn out too far. In specific configurations of a high lift system, this could suffice in presetting a maximum dimension of a gap and in preventing a flexing of the flap outwards to increase the gap.

In an advantageous embodiment of the invention, the rotary actuator is an electric, hydraulic or pneumatic actuator which can actively move the winding body. This is particularly useful when the flap concerned performs a particularly pronounced translatory movement and a torsion spring cannot ensure a constant tensile force over the entire length of the retaining element. An electric drive for example, preferably with a transmission, would be considered for this purpose.

In an advantageous embodiment, the retaining element is connected to a mechanical safety unit which, in the event of an overload, separates the flap from the retaining element. Consequently, if the retaining element sticks, damage to the flap can be prevented.

It is understood that the high lift system according to the invention is not restricted to the use of a single retaining element. Instead, it would be advantageous to distribute a plurality of retaining elements of this type along the entire flap and in the entire high lift system to restrict possible deformation at various discrete points of the flap or of a plurality of flaps. The length of the retaining elements can be predetermined by an adjustment on the ground.

The high lift system according to the invention preferably comprises a Krüger flap which can enter a retracted state and at least one extended state. In a retracted state, the Krüger flap is arranged flush in a recess on the lower side of the basic body and can be rotated by a rotational movement about a pivot, preferably located outside the Krüger flap in order to enter an extended state. With an arrangement of this type of the high lift system, a constant distancing from the trailing flap edge takes place relative to the basic body, when the flap is extended. Thus, with the arrangement of a retaining element, it is possible for the extension length of the retaining element to be restricted so that upon complete activation of the high lift system, a maximum distance between the trailing edge of the flap and the front edge of the basic body is achieved.

Another aspect of the invention includes a method for influencing the high lift characteristics of an aircraft which method comprises the step of extending a high lift flap of the aircraft from a retracted position into an extended position, the high lift flap having a flap edge which forms, with a basic body, a gap between the flap edge and the basic body in the extended position of the flap, and the step of pulling and/or flexing the flap edge in the direction of the basic body by a retaining element which extends between the flap edge and the basic body.

In an advantageous aspect of the method, the retaining element is extended by a displacement device when the high lift flap is extended. In the method according to an aspect of the invention, the high lift flap is preferably moved into a retracted position to deactivate the high lift system and the retaining element is preferably retracted at the same time. In this respect, the retraction and extension of the retaining element preferably involves the winding up and unwinding of the retaining element onto/from a rotatably mounted winding element.

BRIEF DESCRIPTION OF THE DRAWINGS

Further features, advantages and possible uses of the present invention are provided in the following description of the embodiments and figures. In this respect, all the features which are described and/or graphically illustrated form, per se and in any combination, the subject-matter of the invention, also irrespective of their composition in the individual claims or their back references. Furthermore, the same reference signs in the figures denote the same or similar objects.

FIG. 1a to 1d show a high lift system according to the invention comprising a linear retaining element.

DETAILED DESCRIPTION

Figure 1B:
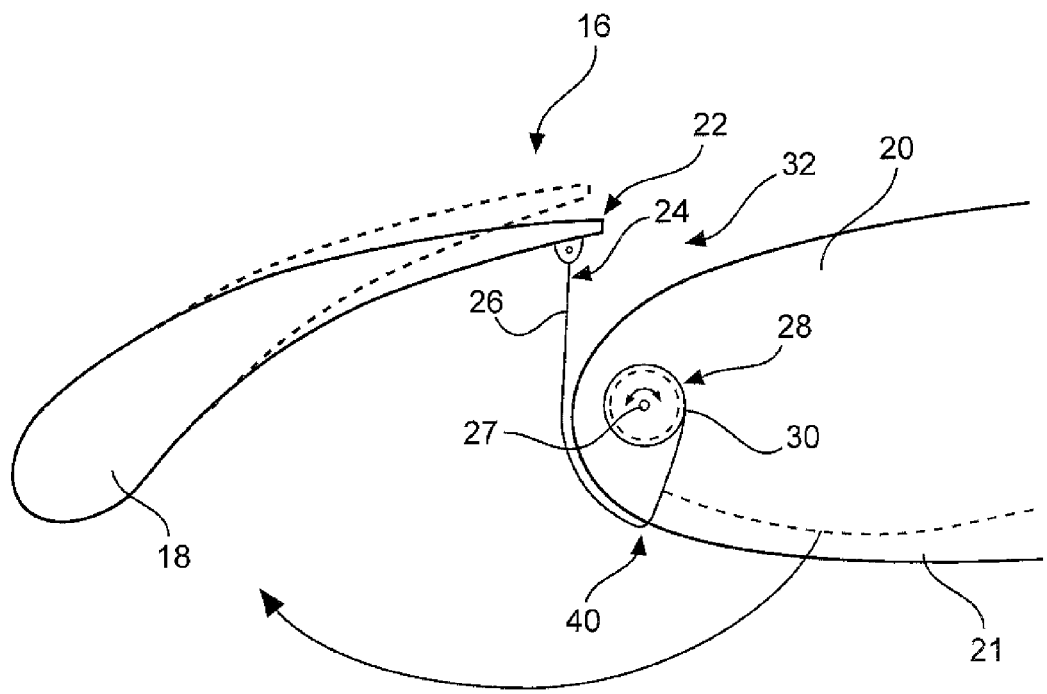
Figure 1B:
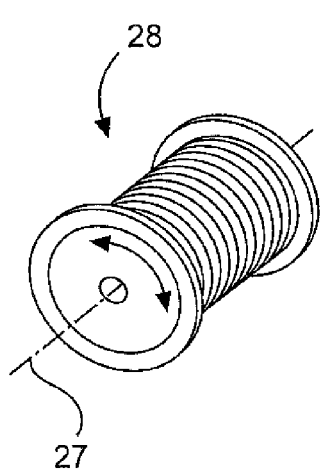

FIG. 1a shows a high lift system 16 according to an embodiment of the invention, in which a Krüger flap 18 can be moved outwards, relative to a wing 20 as an example of a basic body, from a stowed position 21 on a lower side of the wing 20. A free end 24 of a retaining element 26 is mounted on an edge 22 of the flap. This could be achieved, for example, by a punctiform fixed connection between the free end 24 and the flap 18 in the region 22 which is close to the edge.

Figure 1C:
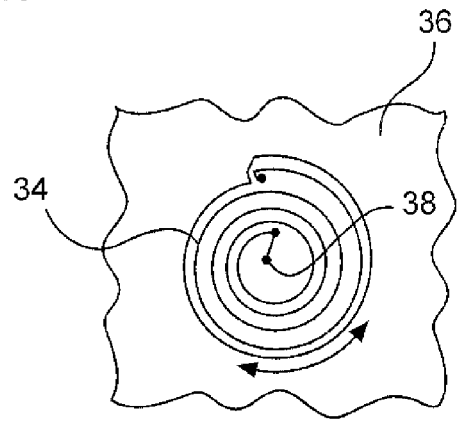

The retaining element 26 is configured as a linear retaining element and is wound onto a winding body 28, which is shown in a three-dimensional view in FIG. 1b and has a winding surface 30. As can be seen from FIG. 1c, a torsion spring 34 is mounted on a structure 36 of the wing 2 and is set up to rotate the winding body 28 in an anti-clockwise direction with a driven end 38 in order to continually tension the retaining element 26 which extends through an opening 40, out of the inside of the wing and towards the region 22 close the edge and to wind it up again during a displacement movement of the flap 18.

Figure 1D:
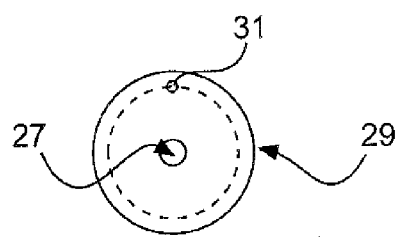

Restricting the available length of the retaining element 26 can restrict the position of the edge 22 of the flap 18. Consequently, the flap 18 can only be deformed such that the gap 32 can only be reduced, but cannot be enlarged. In addition, the movement of the edge 22 can follow the movement of the basic body 20. If it is possible to select the diameter of a winding body 29 shown in FIG. 1d with an axis of rotation 27 such that an incomplete rotation would be enough to provide a sufficient length of the retaining element 26, the provision of a stop 31 which corresponds to a stop on the structure 36 would be expedient to restrict the extensible length of the retaining element 26.

Figure 2:
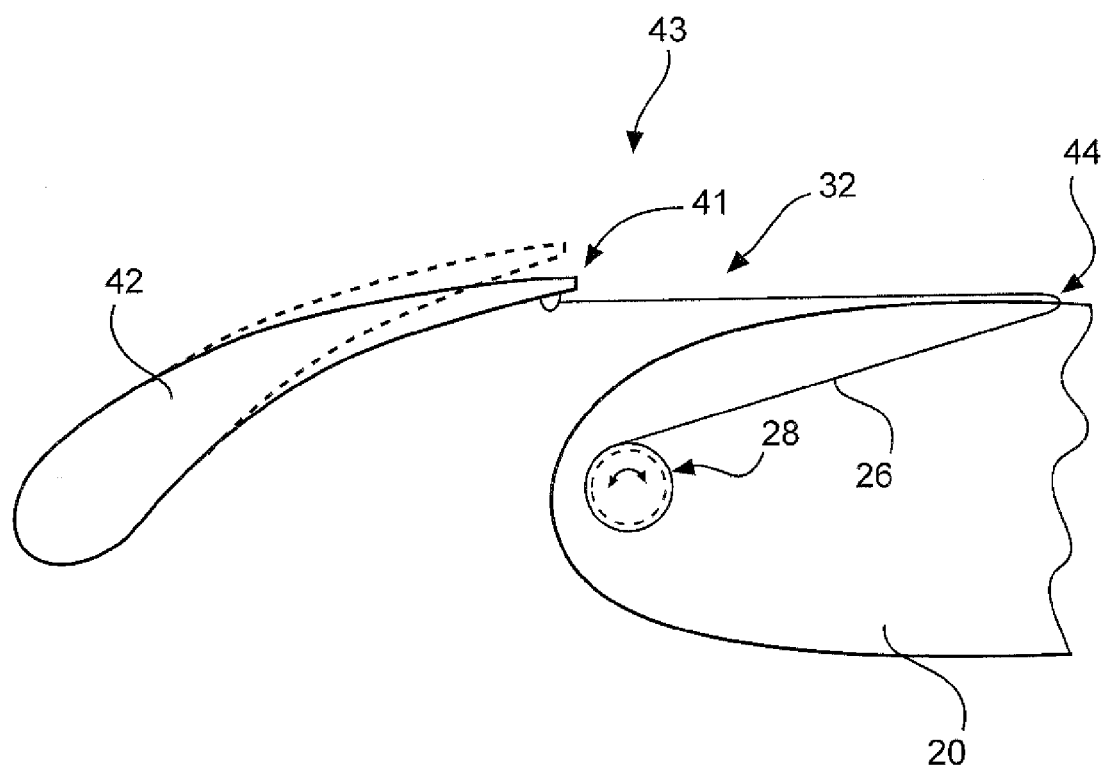
FIG. 2 shows an alternative high lift system according to the invention comprising a linear retaining element.

In the case of a pronounced translatory movement of a flap 42 which is shown in FIG. 2 and which would move on an upper side of the wing 20, an opening 44 located in the upper side of the wing 20 would be necessary to support an edge 41 of the flap. Due to the pronounced translation and to the angle of attack, not drawn to scale, of the retaining element 26, the suppression of the vibration of the flap edge 41 would be slightly less pronounced than in the case of a Krüger flap 18 shown in FIG. 1a.

Figure 3:
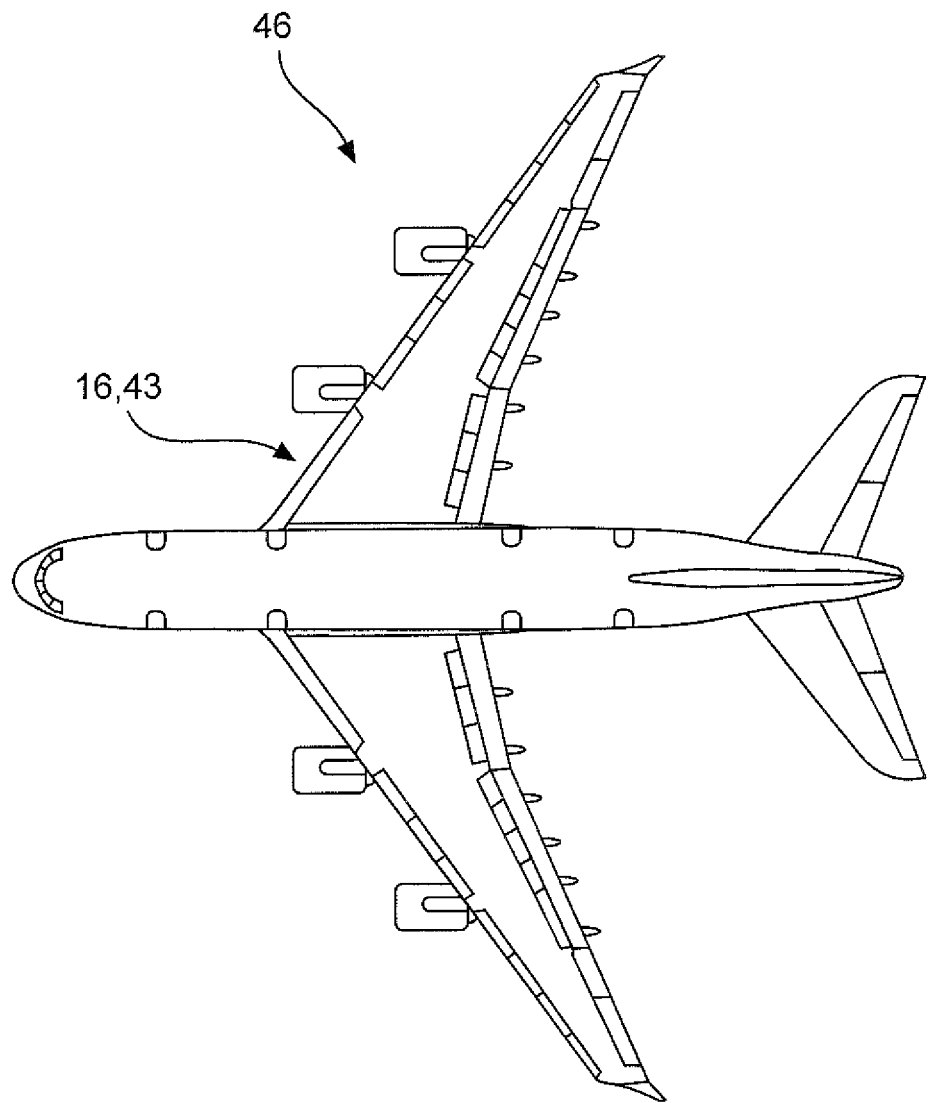
FIG. 3 shows an aircraft comprising a high lift system according to the invention.

FIG. 3 shows an aircraft 46 which is fitted with a high lift system 16, 43 of this type.

Figure 4:
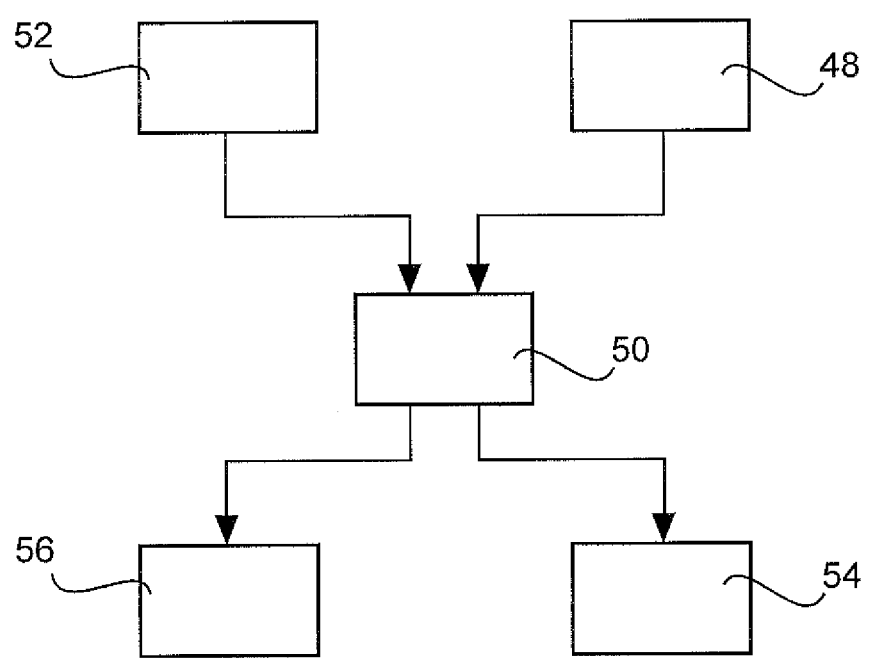
FIG. 4 is a schematic, block-based illustration of a method according to the invention.

Finally, FIG. 4 is a schematic, block-based illustration of a possible sequence of the method according to an aspect of the invention for influencing the high lift characteristics of an aircraft. To activate the high lift system, a high lift flap 18, 42 of the aircraft is moved from a retracted position into an extended position 48. In this respect, the high lift flap 18, 42 has a flap edge 22, 41 which, with a basic body 20 forms, a gap 32 between the flap edge 22, 41 and the basic body 20 in the extended position of the high lift flap 18, 42, as previously described in detail. At the same time or subsequently, the flap edge 22, 41 is flexed or pulled 50 in the direction of the basic body 20 by a retaining element 26, the retaining element 26 extending between the flap edge 22, 41 and the basic body 20. When the high lift flap 18, 42 is extended, the retaining element 26 can be extended 52 by a displacement device, which preferably takes place at the same time. To deactivate the high lift system, the high lift flap 18, 42 is moved into a retracted position 54, the retaining element 26 being retracted 56 at the same time. The retraction and extension procedures can be performed by winding the retaining element onto and unwinding it from a winding body.

In addition, it should be noted that "comprising" does not exclude any other elements or steps and "one" or "a/an" does not exclude a plurality. It should also be noted that features which have been described with reference to one of the above embodiments can also be used combined with other features of other embodiments described above. Reference signs in the claims should not be considered as restrictions.

REFERENCE NUMERALS 16 high lift system
18 flap
20 wing
21 stowed position
22 edge of flap
24 free end
26 retaining element
27 axis of rotation
28 winding body
30 winding surface
31 stop
32 gap
34 torsion spring
36 structure
38 driven end
40 opening
41 edge of flap
42 flap
43 flap system
44 opening
46 aircraft
48 extension of (high lift) flap
50 pulling/flexing of flap edge
52 extension of retaining element
54 retraction of (high lift) flap
56 retraction of retaining element

The invention claimed is:
1. A high lift system for an aircraft, the high lift system comprising:
   a base body;
   a flap movably mounted on the base body and having a flap edge;

a retaining element, and a displacement device configured to secure the retaining element at a first end of the retaining element and to provide a second end of the retaining element extending away from the displacement device, wherein the flap system is set up to form a gap between the flap edge and the base body, wherein the retaining element is mounted on a region of the flap close to the flap edge and extends towards the base body to restrict the distance between the flap edge and the base body such that the flap edge can be pulled or flexed or both pulled and flexed by the retaining element in the direction of the base body, wherein the distance between the flap edge and the base body is adjustable, and wherein the base body is a wing of an aircraft and the flap is a flap arranged on a leading edge of the wing, and wherein the retaining element is a linear attachment means and the displacement device comprises a rotatably mounted winding body for winding up the retaining element.

2. The high lift system according to claim 1, wherein the displacement device is arranged in the base body.

3. The high lift system according to claim 1, further comprising a movement means coupled to the winding body and configured to rotate the winding body.

4. The high lift system according to claim 3, wherein the movement means is a spring element.

5. The high lift system according to claim 3, wherein the movement means is an actuator.

6. The high lift system according to claim 1, wherein the retaining element is selected from a group of retaining elements, the group consisting of:

wire rope;

braided fibre composite with fibres on an organic and inorganic basis;

mixture of wire rope and fibres on an organic and inorganic basis.

7. A method for influencing the high lift characteristics of an aircraft, the method comprising:

extending a high lift flap of the aircraft from a retracted position into an extended position, wherein the high lift flap has a flap edge which, with a base body, forms a gap between the flap edge and the base body in the extended position of the high lift flap; and pulling or flexing or both pulling and flexing the flap edge in the direction of the base body by a linear attachment means extending between the flap edge and the base body for adjusting the distance between the flap edge and the base body, the linear attachment means secured at a first end thereof by a a rotatably mounted winding body and having a second end thereof extending away from the rotatably mounted winding body, wherein the base body is a wing of an aircraft and the flap is a flap arranged on a leading edge of the wing.

8. The method according to claim 7, further comprising:

extending the linear attachment means by the rotatably mounted winding body when the high-lift flap is extended.

9. The method according to claim 8, wherein the retraction or extension of the linear attachment means comprises winding onto or unwinding from the rotatably mounted winding body.

10. The method according to claim 7, further comprising: retracting the high lift flap into a retracted position; and retracting the linear attachment means.

* * * * *